United States Patent
Jalfon et al.

(10) Patent No.: US 7,496,196 B2
(45) Date of Patent: Feb. 24, 2009

(54) METHOD APPARATUS AND SYSTEM OF PERFORMING ONE OR MORE ENCRYPTION AND/OR DECRYPTION OPERATIONS

(75) Inventors: Marc Jalfon, Zichron Yaakov (IL); Boris E. Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 10/879,495

(22) Filed: Jun. 30, 2004

(65) Prior Publication Data
US 2006/0018477 A1 Jan. 26, 2006

(51) Int. Cl.
*H04L 9/00* (2006.01)
(52) U.S. Cl. .......................... 380/29; 380/37; 380/265; 712/212; 712/223
(58) Field of Classification Search .................. 712/21, 712/212, 223; 380/37, 29, 265
See application file for complete search history.

(56) References Cited

U.S. PATENT DOCUMENTS

| 7,321,910 | B2 * | 1/2008 | Crispin et al. ............... 708/231 |
| 2003/0046563 | A1 * | 3/2003 | Ma et al. ..................... 713/190 |
| 2004/0184602 | A1 * | 9/2004 | Nadehara ..................... 380/28 |

OTHER PUBLICATIONS

Federal Information Processing Standards Publication 197, "Announcing the Advanced Encryption Standard (AES)", Nov. 26, 2001.
Federal Information Processing Standards Publication 46-3, "Data Encryption Standard (DES)", Reaffirmed Oct. 25, 1999.
Hodjat & Verbauwhede, "Speed-Area Trade-off for 10 to 100 Gbits/s Throughput AES Processor", University of California, Dept. of Electrical Engineering.
Pasham & Trimberger, "High-Speed DES and Triple DES Encryptor/Decryptor", Xilinx XAPP270 (v1.0), Aug. 3, 2001.

* cited by examiner

*Primary Examiner*—Emmanuel L Moise
*Assistant Examiner*—Paul Callahan
(74) *Attorney, Agent, or Firm*—Pearl Cohen Zedek Latzer, LLP

(57) ABSTRACT

Embodiments of the present invention provide a method and apparatus of performing on one or more bytes of an input data block at least one predetermined encryption or decryption operation.

15 Claims, 4 Drawing Sheets

METHOD APPARATUS AND SYSTEM OF PERFORMING ONE OR MORE ENCRYPTION AND/OR DECRYPTION OPERATIONS

BACKGROUND OF THE INVENTION

Methods of encrypting/decrypting a data block may include performing one or more encryption or decryption operations. Some of these methods may include iteratively performing one or more of the encryption or decryption operations. For example the Advanced Encryption Standard (AES) defines an encryption/decryption cipher including iteratively performing a plurality of predetermined AES operations on a state array representing the data block.

Some conventional encryption/decryption devices may use a conventional processor to perform one or more computations including a predetermined sequence of "standard" arithmetical operations, e.g., including addition, subtraction, multiplication and/or division, in order to achieve a result equivalent to the predetermined encryption or decryption operations. Such computations, e.g., when performed on a relatively large data block, may be time consuming and/or may require relatively high utilization of the processor computational resources, and thus may be power consuming.

Other conventional devices may implement an encryption accelerator, e.g., one or more hardware elements associated with a processor and dedicated to performing one or more of the encryption/decryption operations on an input data block, e.g., received form the processor. The use of such devices may be time and/or power consuming, since the input data block must be transferred from the processor to the encryption accelerator and the output of the encryption accelerator must be transferred back to the processor after performing each encryption or decryption operation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
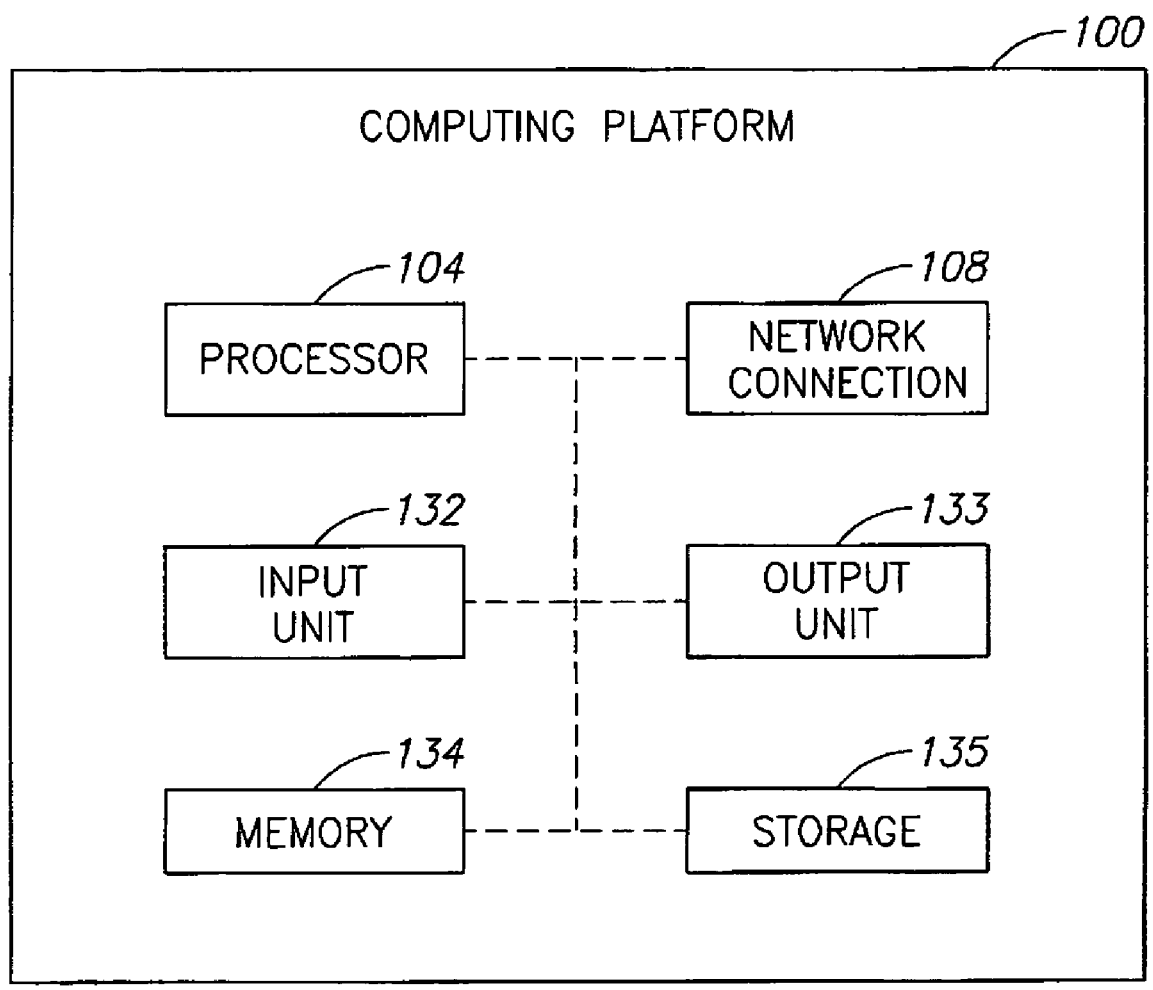
FIG. 1 is a schematic block-diagram illustration of a computing platform including a processor able to perform one or more encryption or decryption operations according to some exemplary embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

It should be understood that the present invention may be used in any computing platform including a processor. Although the present invention is not limited in this respect, the computing platform may be a portable device. Non-limiting examples of such portable devices include laptop and notebook computers, mobile telephones, personal digital assistants (PDA), and the like. Alternatively, the computing platform may be a non-portable device, such as, for example, a desktop computer.

Reference is made to FIG. 1, which schematically illustrates a computing platform 100 according to exemplary embodiments of the invention.

According to the exemplary embodiments of FIG. 1, computing platform 100 may include a processor 104 able to perform at least one predetermined encryption/decryption operation on at least part of an input data block, as described in detail below.

According to some exemplary embodiments of the invention, platform 100 may optionally include a network connection 108 adapted to interact with a communication network, for example, a local area network (LAN), wide area network (WAN), or a global communication network, for example, the Internet. According to some embodiments the communication network may include a wireless communication network such as, for example, a wireless LAN (WLAN) communication network. Types of WLAN communication systems intended to be within the scope of the present invention include, although are not limited to, WLAN communication systems as described by "IEEE-Std 802.11, 1999 Edition (ISO/IEC 8802-11: 1999)" standard, and more particularly in "IEEE-Std 802.11i Supplement to 802.11-1999: Wireless LAN MAC and PHY specifications: Enhanced MAC layer security" ("the 802.1 µl standard") and the like.

Although the scope of the present invention is not limited in this respect, the communication network may include a cellular communication network, with platform 100 being, for example, a base station, or a mobile station. The cellular communication network, according to some embodiments of the invention, may be a $3^{rd}$ Generation Partnership Project (3GPP), such as, for example, Frequency Domain Duplexing (FDD), Global System for Mobile cormnunications (GSM), Wideband Code Division Multiple Access (WCDMA) cellular communication network and the like.

According to some exemplary embodiments of the invention, although the invention is not limited in this respect, network connection 108 may be adapted to interact with a WLAN communication network, e.g., in accordance with the 802.11i standard, and processor 104 may be able to perform one or more encryption/decryption operations on a data block received via connection 108 or a data block to be transmitted via connection 108, as described below.

According to some exemplary embodiments of the invention, computing platform 100 may also include an input unit 132, an output unit 133, a memory unit 134, and a storage unit 135. Computing platform 100 may additionally include other suitable hardware components and/or software components.

Input unit 132 may include, for example, a keyboard, a mouse, a touch-pad, or other suitable pointing device or input device. Output unit 133 may include, for example, a Cathode Ray Tube (CRT) monitor, a Liquid Crystal Display (LCD) monitor, or other suitable monitor or display unit. Storage unit 135 may include, for example, a hard disk drive, a floppy disk drive, a Compact Disk (CD) drive, a CD-Recordable (CD-R) drive, or other suitable removable and/or fixed storage unit. Memory unit 134 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Figure 2:
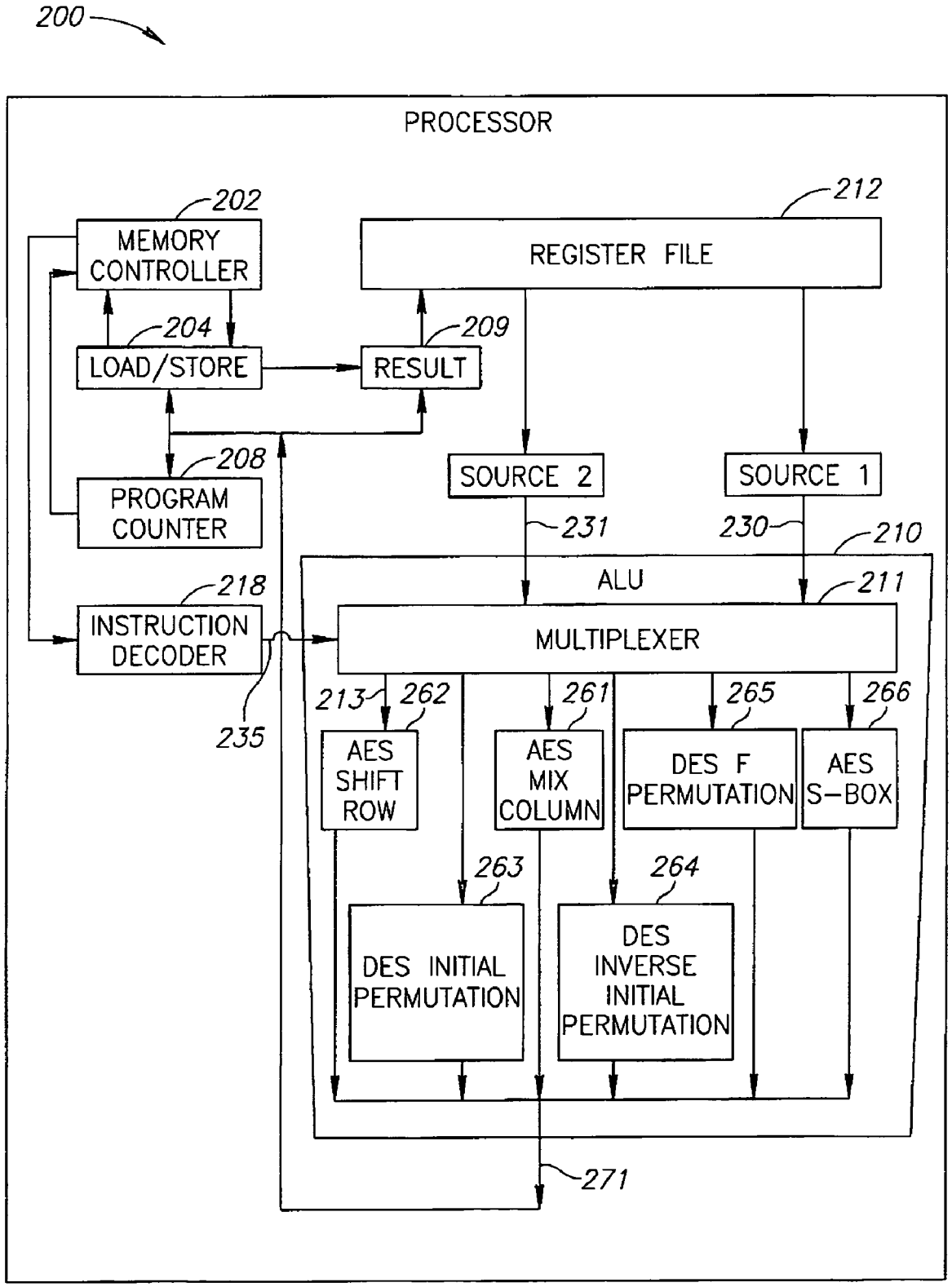
FIG. 2 is a schematic block-diagram illustration of a processor able to perform one or more encryption or decryption operations according to some exemplary embodiments of the invention.

Reference is made to FIG. 2, which schematically illustrates a processor 200 according to some exemplary embodiments of the invention. Although the invention is not limited in this respect, processor 200 may be used to perform the functionality of processor 104 of FIG. 1.

According to exemplary embodiments of the invention, processor 200 may be able to perform one or more encryption or decryption operations in accordance with the "Advanced Encryption Standard—Federal Information Processing Standards Publication 197 of Nov. 26, 2001 ("the AES standard"), and/or the "Data Encryption Standard—Federal Information Processing Standards Publication 46-3 of Oct. 25, 1999 ("the DES standard"), as described below. However, it will be appreciated by those skilled in the art, that processor 200 may be modified to enable performing encryption and/or decryption operations in accordance with any other desired encryption and/or decryption cipher, for example, as described by the RC4 standard, the triple DES (3DES) standard and the like.

According to some exemplary embodiments of the invention, processor 200 may include a register file 212 adapted to store, for example, one or more data blocks, e.g., 64-bit, 128-bit or 256-bit data blocks, as known in the art. Processor 200 may also include a memory controller 202, a load/store module 204, a Program Counter (PC) 208, a result module 209 and/or any other suitable software and/or hardware, as are known in the art.

According to exemplary embodiments of the invention, processor 200 may also include an instruction decoder 218 and an Arithmetic Logic Unit (ALU) 210 able to perform at least one predetermined encryption or decryption operation on one or more bytes, e.g., of the data block stored by register file 212, as described in detail below.

According to exemplary embodiments of the invention, memory controller 202 may be able to retrieve ("fetch") from a memory (not shown) one or more predetermined encryption or decryption instructions, e.g., from a memory location provided by program counter 208. Memory controller 202 may also retrieve an input data block from the memory and transfer the input data block, e.g., via load/store module 204, to register file 212. Instruction decoder 218 may be adapted to translate ("decode") the one or more encryption or decryption instructions fetched by memory controller 202 and to provide ALU 210 with one or more corresponding operation instructions 235. For example, instruction decoder 218 may include a command list including the one or more predetermined encryption or decryption instructions and one or more respective operation instructions to be provided to ALU 210, e.g., via signal 235, as described below. Instruction decoder may also control register file 212, e.g., based on the decoded instructions, to provide ALU 210 with a first ALU input 230 and/or a second ALU input 231, e.g., including one or more bytes of the input data block.

According to exemplary embodiments of the invention, ALU 210 may receive instruction 235 and execute an encryption or decryption operation corresponding to operation instruction 235, i.e., by performing on input 230 and/or input 231 the encryption or decryption operation corresponding to operation instruction 235, as described below.

According to some exemplary embodiments of the invention, ALU 210 may include one or more operation modules for performing one or more encryption/decryption operations, e.g., AES and/or DES encryption/decryption operations, on the data received via input 230 and/or input 231. For example, ALU 210 may include an AES S-box module 266, an AES mix-column module 261, an AES shift-row module 262, a DES initial-permutation module 263, a DES inverse-initial-permutation module 264, a DES F-permutation module 265, and/or any other module adapted to perform a predetermined encryption or decryption operation, as described below.

According to some exemplary embodiments of the invention, ALU 210 may also include a selector, e.g., a multiplexer 211, able to selectively provide one of modules 261, 262, 263, 264, 265 and 266 with an input corresponding to input 230 and/or input 231 in accordance with operation instruction 235. For example, multiplexer 211 may provide AES shift-row module 262 with an input 213 corresponding to input 230 and/or input 231, e.g., if operation instruction 235 includes an AES shift-row operation instruction. It will be appreciated by those skilled in the art that other embodiments of the invention may include any suitable hardware and/or circuitry for selectively providing one of the operation modules with an input corresponding to one or more inputs provided by register file 212 to ALU 210, e.g., in accordance with operation instruction 235.

According to some exemplary embodiments of the invention, ALU 210 may be able to perform on one or more bytes of the data block stored in register file 212 one or more AES encryption or decryption operations, as described below.

The AES defines an input state array, s, including, for example, 128 bits divided into sixteen 8-bit bytes ("words"), denoted $S_{r,c}$ e.g., arranged in four columns and four rows, wherein $s_{r,c}$ denotes the word of the r-th row and c-th column of s, and wherein r=0 . . . 3 and c=0 . . . 3.

According to some exemplary embodiments of the invention, the input data block retrieved by memory controller 202 may include an AES data block, e.g., including 128 bits, representing the state array s. For example, bits 0-31 of the AES data block may correspond to the first row of s, bits 32-63 of the 128-bit data block may correspond to the second row of s, bits 64-95 of the 128-bit data block may correspond to the third row of s, and bits 96-127 of the 128-bit data block may correspond to the first row of s. Accordingly, bits 0-7, 32-39, 64-71 and 96-103 may correspond to the first column of s; bits 8-15, 40-47, 72-79 and 104-111 may correspond to the second column of s; bits 16-23, 48-55, 80-87 and 112-119 may correspond to the third column of s; and bits 24-31, 56-63, 88-95 and 120-127 may correspond to the fourth column of s.

Although some exemplary embodiments of the invention described herein may refer to devices and/or methods of performing encryption and/or decryption operations on an AES state array including 128 bits, it will be appreciated by those skilled in the art that devices and/or methods according to embodiments of the invention may enable performing the encryption and/or decryption operations on a state array of any other configuration, for example, a state array including 256 bits.

According to exemplary embodiments of the invention, AES s-box module 266 may be able to receive, e.g., via input 230 and/or input 231, at least one bit of the AES data block, and to provide an ALU output 271 corresponding to a result of the AES s-box operation performed on the at least one bit of the AES data block.

According to some exemplary embodiments of the invention, module 266 may be able to perform the AES shift-row operation on two or more bits of the AES data block simultaneously. For example, module 262 may be adapted to receive from register file 212 all 128 bits of the AES data block and perform the AES s-box operation simultaneously on substantially all bits of the AES data block, e.g., according to the following AES s-box table:

to the S-box transformation of the value of the input byte. For example, input data block 302 may include a 128-bit data block including sixteen 8-bit bytes 330-345, and S-box module 300 may include sixteen s-box transformation elements 310-325, able to receive bytes 330-345 and produce sixteen output bytes 350-365 of an output data block 304, respectively. Elements 310-325 may include any suitable circuitry and/or hardware for producing an output byte having a value corresponding to an S-box transformation of a value of a received input byte. For example, one or more of elements 310-325 may include a Look Up Table (LUT) including the 256 values of Table 1 and adapted to produce an 8-bit output byte having one of the 256 values corresponding to the value of an 8-bit input byte.

Referring back to FIG. 2, according to exemplary embodiments of the invention, AES shift-row module 262 may be able to receive, e.g., via input 230 and/or input 231, at least

TABLE 1

| | | y | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| x | 0 | 63 | 7c | 77 | 7b | f2 | 6b | 6f | c5 | 30 | 01 | 67 | 2b | fe | d7 | ab | 76 |
| | 1 | ca | 82 | c9 | 7d | fa | 59 | 47 | f0 | ad | d4 | a2 | af | 9c | a4 | 72 | c0 |
| | 2 | b7 | fd | 93 | 26 | 36 | 3f | f7 | cc | 34 | a5 | e5 | f1 | 71 | d8 | 31 | 15 |
| | 3 | 04 | c7 | 23 | c3 | 18 | 96 | 05 | 9a | 07 | 12 | 80 | e2 | eb | 27 | b2 | 75 |
| | 4 | 09 | 83 | 2c | 1a | 1b | 6e | 5a | a0 | 52 | 3b | d6 | b3 | 29 | e3 | 2f | 84 |
| | 5 | 53 | d1 | 00 | ed | 20 | fc | b1 | 5b | 6a | cb | be | 39 | 4a | 4c | 58 | cf |
| | 6 | d0 | ef | aa | fb | 43 | 4d | 33 | 85 | 45 | f9 | 02 | 7f | 50 | 3c | 9f | a8 |
| | 7 | 51 | a3 | 40 | 8f | 92 | 9d | 38 | f5 | bc | b6 | da | 21 | 10 | ff | f3 | d2 |
| | 8 | cd | 0c | 13 | ec | 5f | 97 | 44 | 17 | c4 | a7 | 7e | 3d | 64 | 5d | 19 | 73 |
| | 9 | 60 | 81 | 4f | dc | 22 | 2a | 90 | 88 | 46 | ee | b8 | 14 | de | 5e | 0b | db |
| | a | e0 | 32 | 3a | 0a | 49 | 06 | 24 | 5c | c2 | d3 | ac | 62 | 91 | 95 | e4 | 79 |
| | b | e7 | c8 | 37 | 6d | 8d | d5 | 4e | a9 | 6c | 56 | f4 | ea | 65 | 7a | ae | 08 |
| | c | ba | 78 | 25 | 2e | 1c | a6 | b4 | c6 | e8 | dd | 74 | 1f | 4b | bd | 8b | 8a |
| | d | 70 | 3e | b5 | 66 | 48 | 03 | f6 | 0e | 61 | 35 | 57 | b9 | 86 | c1 | 1d | 9e |
| | e | e1 | f8 | 98 | 11 | 69 | d9 | 8e | 94 | 9b | 1e | 87 | e9 | ce | 55 | 28 | df |
| | f | 8c | a1 | 89 | 0d | bf | e6 | 42 | 68 | 41 | 99 | 2d | 0f | b0 | 54 | bb | 16 | wherein the value of output of module 266 corresponding to an input bit having a hexadecimal value {xy}, may be determined by the value located at the intersection of x-th row and y-th column of Table 1. For example, output 271 may have a value {ed} if the input the module 266 has a value {53}.

According to these exemplary embodiments, the command list of instruction decoder 218 may include, for example, the instruction AESSBOX xmm1,xmm2/m128. Upon receiving this instruction, e.g., from memory controller 202, instruction decoder 218 may be adapted to control register file 212 to provide ALU with a 128-bit data block stored at a memory location xmm2, e.g., of register file 212, to control ALU 210, e.g., using instruction 235, to execute the AES s-box operation, and to store output 271 at a memory location xmm1, e.g., of register file 212.

According to exemplary embodiments of the invention, module 266 may include any suitable hardware implementation for performing the AES s-box operation on one or more rows of the AES data block, e.g., as describe below.

Figure 3:
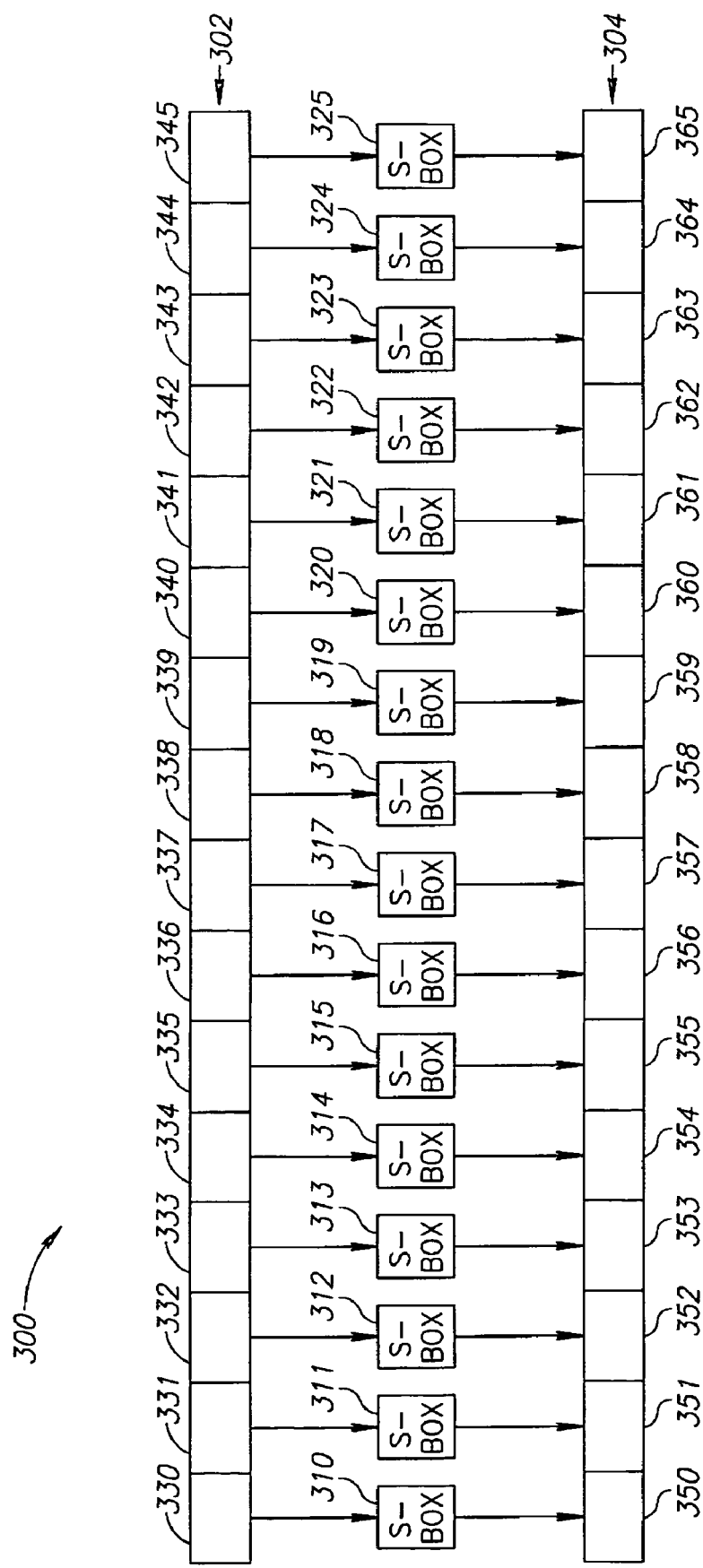
FIG. 3 is a schematic illustration of an S-box module according to some exemplary embodiments of the invention.

Reference is made to FIG. 3, which schematically illustrates a S-box module 300 in accordance with some exemplary embodiments of the invention. Although the invention is not limited in this respect, S-box module 300 may be used to perform the functionality of S-box module 266 of FIG. 2.

According to exemplary embodiments of the invention, S-box module 300 may include a plurality of s-box transform elements, each able to receive a byte of an input data block 302 and provide an output byte having a value corresponding one row of the AES data block, and to provide an ALU output 271 corresponding to a result of the AES shift-row operation performed on the at least one row of the AES data block.

According to some exemplary embodiments of the invention, module 262 may be able to perform the AES shift-row operation on two or more rows of the AES data block simultaneously. For example, module 262 may be adapted to receive from register file 212 all 128 bits of the AES data block and perform the AES shift-row operation simultaneously on substantially all rows of the AES data block, e.g., according to the following pseudo code:

DEST[31-0]<--SRC[31-0]
DEST[63-32]<--SRC[63-32]<<<8
DEST[95-64]<--SRC[95-64]<<<16
DEST[127-96]<--SRC[127-96]<<<24 wherein SRC[31-0], SRC[63-32], SRC[95-64] and SRC[127-96] denote bits 0-31, 32-63, 64-95 and 96-127 of the input to module 262, respectively, DEST[31-0], DEST [63-32], DEST [95-64] and DEST [127-96] denote bits 0-31, 32-63, 64-95 and 96-127 of output 271, respectively, and <<<8, <<<16, <<<24 denote a cyclic shift left of 8 bits, 16 bits and 24 bits, respectively, as known in the art.

According to these exemplary embodiments, the command list of instruction decoder 218 may include, for example, the instruction AESSHIFTROW xmm1,xmm2/m128. Upon receiving this instruction, e.g., from memory controller 202, instruction decoder 218 may be adapted to control register file 212 to provide ALU with a 128-bit data block stored at memory location xmm2, to control ALU 210, e.g., using instruction 235, to perform the AES shift-row operation, and to store output 271 at memory location xmm1.

According to exemplary embodiments of the invention, module 262 may include any suitable hardware implementation for performing the AES shift-row operation on one or more rows of the AES data block, e.g., as known in the art.

According to exemplary embodiments of the invention, AES mix-column module 261 may be able to receive, e.g., via input 230 and/or input 231, at least one column of the AES data block, and to provide ALU output 271 corresponding to a result of the AES mix-column operation performed on the at least one row of the AES data block. According to some exemplary embodiments of the invention, module 261 may be able to perform the AES mix-column operation on two or more columns of the AES data block simultaneously. For example, module 261 may be adapted to receive from register file 212 all 128 bits of the AES data block and perform the AES mix-column operation simultaneously on substantially all columns of the AES data block, e.g., according to the following equation set:

$$S''_{0,c} = (\{02\} \cdot S_{0,c}) \oplus (\{03\} \cdot S_{1,c}) \oplus S_{2,c} \oplus S_{3,c}$$

$$S''_{1,c} = S_{0,c} \oplus (\{02\} \cdot S_{1,c}) \oplus (\{03\} \cdot S_{2,c}) \oplus S_{3,c}$$

$$S''_{2,c} = S_{0,3} \oplus S_{1,c} \oplus (\{02\} \cdot S_{2,c}) \oplus (\{03\} \cdot S_{3,c})$$

$$S''_{3,c} = (\{03\} \cdot S_{0,c}) \oplus S_{1,c} \oplus S_{2,c} \oplus (\{02\} \cdot S_{3,c}) \quad (1)$$

wherein $s'_{r,c}$ denotes the value of byte $s_{r,c}$ of the state array after performing the ShiftRow operation, wherein the symbol "$\oplus$" denotes an addition modulo 2 operation, i.e., a bitwise XOR, and wherein the symbol "·" denotes a polynomial multiplication modulo $m(x)=x^8+x^4+x^3+x+1$.

According to these exemplary embodiments, the command list of instruction decoder 218 may include, for example, the instruction AESMIXCOL xmm1,xmm2/m128. Upon receiving this instruction, e.g., from memory controller 202, instruction decoder 218 may be adapted to control register file 212 to provide ALU with a 128-bit data block stored at memory location xmm2, to control ALU 210, e.g., using instruction 235, to perform the AES mix-column operation, and to store output 271 at memory location xmm1.

According to exemplary embodiments of the invention, module 261 may include any suitable hardware implementation for performing the AES mix-column operation, e.g., as known in the art.

According to some exemplary embodiments of the invention, ALU 210 may be able to perform one or more DES encryption or decryption operations, as described below.

The DES defines encryption and decryption algorithms, which may include iteratively performing on a 64-bit data block a plurality of encryption and/or decryption operations, e.g., including the DES initial permutation operation, the DES inverse initial permutation operation, and the F-permutation operation.

According to some exemplary embodiments of the invention, the 64-bit data block may be represented using a DES data block, which may be, for example, stored by register file 212.

According to exemplary embodiments of the invention, DES initial permutation module 263 may be able to receive, e.g., via input 230 and/or input 231, one or more bits of the DES data block and provide ALU output 271 corresponding to a result of the DES initial permutation operation performed on the one or more bits of the DES data block. For example, module 263 may be adapted to simultaneously receive all 64 bits of the DES block and simultaneously perform the DES initial permutation operation on substantially all 64 bits of the DES block. For example, module 263 may provide output 271 by replacing each bit of the DES data block with another bit of the DES data block, e.g., according to the following permutation table ("the DES IP table"):

TABLE 2

| IP | | | | | | | |
|----|----|----|----|----|----|----|----|
| 58 | 50 | 42 | 34 | 26 | 18 | 10 | 2 |
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9  | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 | wherein each number in Table 2 relates to the location in the DES data block of the bit to be outputted by module 263. For example, the first, second and third bits of output 271 may include the $58^{th}$, $50^{th}$, and $42^{nd}$ bits of the DES data block, respectively.

According to these exemplary embodiments, the command list of instruction decoder 218 may include, for example, the instruction DESINITPER xmm1,xmm2/nz64. Upon receiving this instruction, e.g., from memory controller 202, instruction decoder 218 may be adapted to control register file 212 to provide ALU with a 64-bit data block stored at memory location xmm2, to control ALU 210, e.g., using instruction 235, to perform the DES initial permutation operation, and to store output 271 at memory location xmm1.

According to exemplary embodiments of the invention, module 263 may include any suitable hardware implementation for performing the DES initial permutation operation, e.g., as known in the art.

According to exemplary embodiments of the invention, DES inverse initial permutation module 264 may be able to receive, e.g., via input 230 and/or input 231, one or more bits of the DES data block and provide ALU output 271 corresponding to a result of the DES inverse initial permutation operation performed on the one or more bits of the DES data block. For example, module 264 may be adapted to simultaneously receive all 64 bits of the DES block and simultaneously perform the DES inverse initial permutation operation on substantially all 64 bits of the DES block. For example, module 264 may provide output 271 by replacing each bit of the DES data block with another bit of the DES data block, e.g., according to the following permutation table ("the DES IP$^{-1}$ table"):

TABLE 3

| IP$^{-1}$ | | | | | | | |
|----|----|----|----|----|----|----|----|
| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9  | 49 | 17 | 57 | 25 | wherein each number in Table 3 relates to the location in the DES data block of the bit to be outputted by module 264. For example, the first, second and third bits of output 271 may include the 40$^{th}$, 8$^{th}$, and 48$^{th}$ bits of the DES data block, respectively.

According to these exemplary embodiments, the command list of instruction decoder 218 may include, for example, the instruction DESINVINITPER xmm1,xmm2/m64. Upon receiving this instruction, e.g., from memory controller 202, instruction decoder 218 may be adapted to control register file 212 to provide ALU with a 64-bit data block stored at memory location xmm2, to control ALU 210, e.g., using instruction 235, to perform the DES inverse-initial permutation operation, and to store output 271 at memory location xmm1.

According to exemplary embodiments of the invention, module 264 may include any suitable hardware implementation for performing the DES inverse initial permutation operation, e.g., as known in the art.

According to exemplary embodiments of the invention, DES F-permutation module 265 may be able to receive, e.g., via input 230 and/or input 231, one or more bits of the DES data block and provide ALU output 271 corresponding to a result of the DES F-permutation operation performed on the one or more bits of the DES data block. For example, module 265 may be adapted to simultaneously receive all 64 bits of the DES block and simultaneously perform the DES F-permutation operation on substantially all 64 bits of the DES block. For example, module 265 may provide output 271 according to the following pseudo code:

DEST[63-32]=SRC[31-0]
DEST[31-0]=f(SRC[63-32],K)

wherein K denotes 48 bits of a predetermined Key array as defined by the DES, and wherein f(SRC[63-32], K) denotes a cipher function as defined by the DES. For example, f(SRC[63-32], K) may be provided by the following pseudo code:

```
uiunt3 DES_f(uint32 R, uint48 K)
{
uint48 A;
uint32 B;
A=E(R);
A=A xor K;
B=S(A);
out=P(B);
}
``` wherein R denotes bits SRC[63-32], wherein E(R) denotes a permutation transforming 32 bit data block R into a 48 bit data block A, e.g., according to the following "E permutation table", wherein each number in the "E permutation table" relates to the location in the data block R of the bit to be outputted:

TABLE 4

E BIT-SELECTION TABLE

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  | wherein S(A) denotes a permutation transforming 48 bit data block A into a 32 bit data block B, e.g., using a set of eight sub-permutations each for transforming six bits of A into 4 bits, as defined by the DES, and wherein P(B) denotes a P permutation, e.g., according to the following "P permutation table", wherein each number in the "P permutation table" relates to the location in the data block B of the bit to be outputted:

TABLE 5

| P |  |  |  |
|----|----|----|----|
| 16 | 7  | 20 | 21 |
| 29 | 12 | 28 | 17 |
| 1  | 15 | 23 | 26 |
| 5  | 18 | 31 | 10 |
| 2  | 8  | 24 | 14 |
| 32 | 27 | 3  | 9  |
| 19 | 13 | 30 | 6  |
| 22 | 11 | 4  | 25 |

According to these exemplary embodiments, the command list of instruction decoder 218 may include, for example, the instruction DESFPERM xmm1, xmm2, xmm3/m64. Upon receiving this instruction, e.g., from memory controller 202, instruction decoder 218 may be adapted to control register file 212 to provide ALU with a 64-bit data block stored at memory location xmm2 and a 48 bit data block corresponding to the DES key and stored at memory location xmm3, to control ALU 210, e.g., using instruction 235, to perform the DES F-permutation operation, and to store output 271 at memory location xmm1.

According to exemplary embodiments of the invention, module 265 may include any suitable hardware implementation for performing the DES F-permutation operation., e.g., as known in the art.

Figure 4:
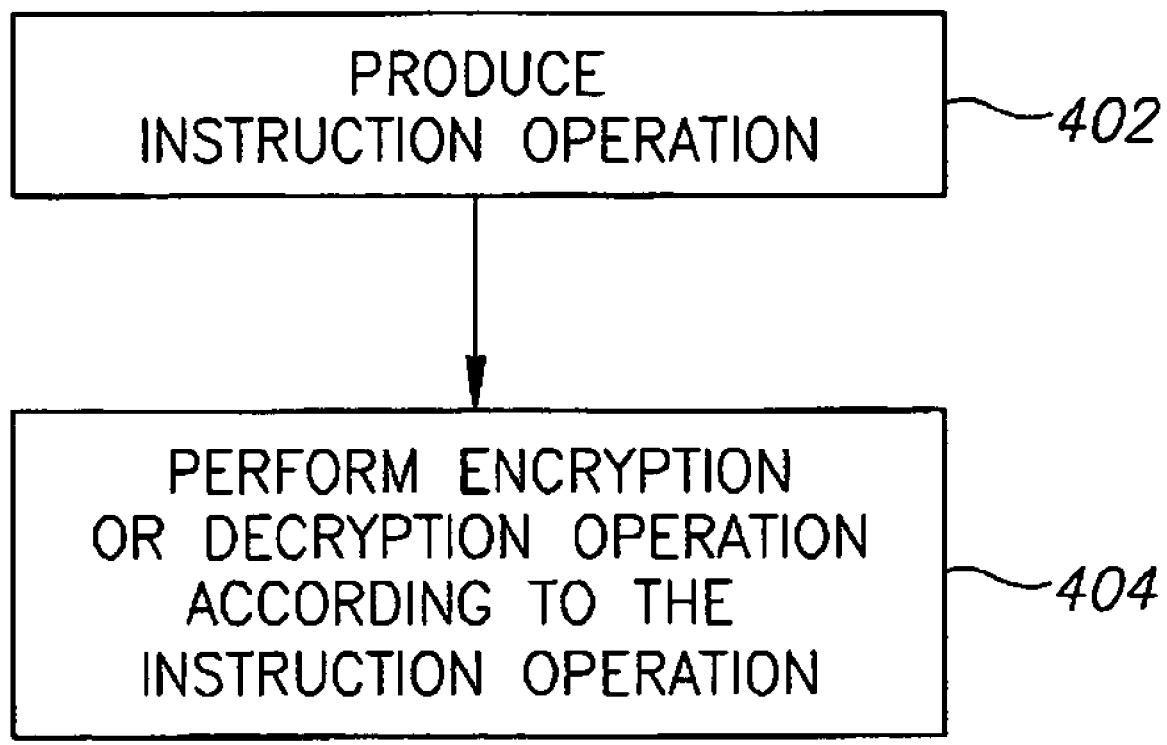
FIG. 4 is a schematic illustration of a flow chart of a method of executing one or more encryption or decryption operations according to some exemplary embodiments of the invention.

Reference is now made to FIG. 4, which schematically illustrates a method of executing one or more encryption or decryption operations according to some exemplary embodiments of the invention.

As indicated at block 402, the method may include generating an instruction operation based on a predetermined encryption or decryption instruction, e.g., using an instruction decoder as described above with reference to FIG. 2.

As indicated at block 404, the method may also include performing on at least part of an input data block a predetermined encryption or decryption operation according to the instruction operation. Performing the predetermined operation may include, for example, simultaneously performing the predetermined operation on one or more bits of the input data block, e.g., as described above.

According to some exemplary embodiments of the invention, the input data block may include an input state array, and the predetermined operation may include an encryption or decryption operation according to the advanced encryption standard, e.g., a shift rows operation, a mix-column operation or an s-box transformation operation as described above with reference to FIG. 2. According to other exemplary embodiments of the invention, the predetermined operation may include an encryption or decryption operation according to the data encryption standard, and the predetermined operation may include an initial permutation operation, an inverse initial permutation operation, or an F-permutation operation.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus for performing encryption or decryption operations comprising:
   an arithmetic logic unit having a plurality of operation modules including an AES S-box module, An AES mix-column module, An AES shift-row module, a DES initial-permutation module, a DES initial-permutation module, a DES inverse-initial-permutation module and a DES F-permutation module, each capable of performing a predetermined encryption or decryption operation that comprises an operation selected from the group consisting of shift-row operation, a mix-column operation, and an S-box transformation operation, on at least part of an input data block having a state array, wherein said arithmetic logic unit is able to perform said shift-row operation on two or more rows of said state array simultaneously; and
   an instruction decoder to receive predetermined instructions corresponding to predetermined encryption or decryption operations, to translate the predetermined instructions to operation instructions and to provide each of said operation instructions to one of said operation modules.

2. The apparatus of claim 1, wherein said arithmetic logic unit is able to perform said shift-row operation on substantially all rows of said state array simultaneously.

3. The apparatus of claim 1, wherein said encryption or decryption operation is according to the Data Encryption Standard.

4. The apparatus of claim 3 wherein said encryption or decryption operation comprises an operation selected from the group consisting of an initial permutation operation, an inverse initial permutation operation, and an F-permutation operation.

5. The apparatus of claim 1, comprising a register file to store at least part of said input data block.

6. The apparatus of claim 1, wherein said arithmetic logic unit is able to perform said predetermined operation on two or more bytes of said input data block simultaneously.

7. An apparatus for performing encryption or decryption operations comprising:
   an arithmetic logic unit having a plurality of operation modules including an AES S-box module, An AES mix-column module, An AES shift-row module, a DES initial-permutation module, a DES inverse-initial-permutation module and a DES F-permutation module, each capable of performing a predetermined encryption or decryption operation that comprises an operation selected from the group consisting of a shift-row operation, a mix-column operation, and an S-box transformation operation, on at least part of an input data block having a state array, wherein said arithmetic logic unit is able to perform said mix-column operation on two or more columns of said state array and
   an instruction decoder to receive predetermined instructions corresponding to predetermined encryption or decryption operations, to translate the predetermined instructions to operation instructions and to provide each of said operation instructions to one of said operation modules.

8. The apparatus of claim 7, wherein said arithmetic logic unit is able to perform said mix-column operation on substantially all columns of said state array simultaneously.

9. An apparatus for performing encryption or decryption operations comprising:
   an arithmetic logic unit having a plurality of operation modules including an AES S-box module, An AES mix-column module, An AES shift-row module, a DES initial-permutation module, a DES inverse-initial-permutation module and a DES F-permutation module, each capable of performing a predetermined encryption or decryption operation that comprises an operation selected from the group consisting of a shift-row operation, a mix-column operation, and an S-box transformation operation, on at least part of an input data block having a state array, wherein said arithmetic logic unit is able to perform said s-box transformation operation on two or more bytes of said state array and
   an instruction decoder to receive predetermined instructions corresponding to predetermined encryption or decryption operations, to translate the predetermined instructions to operation instructions and to provide each of said operation instructions to one of said operation modules.

10. The apparatus of claim 9, wherein said arithmetic logic unit is able to perform said s-box transformation operation on substantially all the bytes of said state array simultaneously.

11. A method comprising:
   generating an operation instruction based on a predetermined instruction corresponding to predetermined encryption or decryption operation that comprises an operation selected from the group consisting of a shift-row operation, a mix-column operation. and an S-box transformation operation;
   providing the operation instruction to a corresponding operation module of an arithmetic logic unit, the operation module being an AES S-box module, an AES mix-column module, an AES shift-row module, a DES initial-permutation module, a DES inverse-initial-permutation module or a DES F-permutation module: and
   performing the operation instruction by the corresponding operation module on at least part of an input data block, the block data having a state array, wherein performing comprises simultaneously performing said shift-row operation on two or more rows of said input state array.

12. The method of claim 11, wherein performing comprises simultaneously performing said mix-column operation on two or more columns of said state array.

13. The method of claim 11, wherein performing comprises simultaneously performing said s-box transformation operation on two or more bytes of said input state array.

14. The method of claim 11, wherein said encryption or decryption operation is according to the Data Encryption Standard.

15. The method of claim 14, wherein said encryption or decryption operation comprises an operation selected from the group consisting of an initial permutation operation, an inverse initial permutation operation, or an F-permutation operation.

* * * * *